(12) United States Patent
Gampe

(10) Patent No.: US 10,993,015 B2
(45) Date of Patent: Apr. 27, 2021

(54) EAR JEWELRY WITH INTEGRATED HEADSET

(71) Applicant: NOVA PRODUCTS GMBH, Munich (DE)

(72) Inventor: Judith Gampe, Munich (DE)

(73) Assignee: NOVA PRODUCTS GMBH, Munich (DE)

( * ) Notice: Subject to any disclaimer, the term of this patent is extended or adjusted under 35 U.S.C. 154(b) by 0 days.

(21) Appl. No.: 16/306,674

(22) PCT Filed: Jun. 1, 2017

(86) PCT No.: PCT/EP2017/063398
§ 371 (c)(1),
(2) Date: Dec. 3, 2018

(87) PCT Pub. No.: WO2017/207736
PCT Pub. Date: Dec. 7, 2017

(65) Prior Publication Data
US 2019/0141428 A1 May 9, 2019

(30) Foreign Application Priority Data
Jun. 3, 2016 (DE) ............ 10 2016 110 347.0

(51) Int. Cl.
*H04R 1/10* (2006.01)
*H04M 1/60* (2006.01)
(Continued)

(52) U.S. Cl.
CPC ........... *H04R 1/105* (2013.01); *H04R 1/10* (2013.01); *H04R 1/1016* (2013.01);
(Continued)

(58) Field of Classification Search
CPC ........ H04R 1/105; H04R 1/10; H04R 1/1016; H04R 1/1041; H04M 1/05; H04M 1/6058;
(Continued)

(56) References Cited

U.S. PATENT DOCUMENTS 5,533,130 A * 7/1996 Staton .................... G02C 11/02
181/129
6,636,732 B1 * 10/2003 Boling .................... H04B 1/38
455/404.1
(Continued)

FOREIGN PATENT DOCUMENTS

CN 201142755 Y * 10/2008
CN 101773320 A * 7/2010
(Continued)

OTHER PUBLICATIONS

International Report on Patentability issued in PCT Application No. PCT/EP2017/063398, dated Dec. 6, 2018.
(Continued)

*Primary Examiner* — Davetta W Goins
*Assistant Examiner* — Kuassi A Ganmavo
(74) *Attorney, Agent, or Firm* — Staas & Halsey LLP

(57) ABSTRACT

The invention relates to a piece of ear jewelry having at least one ear part to be worn on each ear of a user, wherein each ear part has a jewelry body, to be worn in a predetermined wearing position on an outside of the ear, and a retaining device for retaining the jewelry body in the wearing position on the ear, wherein the auditory canal of the ear remains free. The piece of ear jewelry incorporates all of the following electrical components completely and so as to be invisible from the outside: a microphone device, a loudspeaker device and a communication unit for providing a bidirectional, wireless communication link to a portable terminal of the
(Continued)

Figure 1:
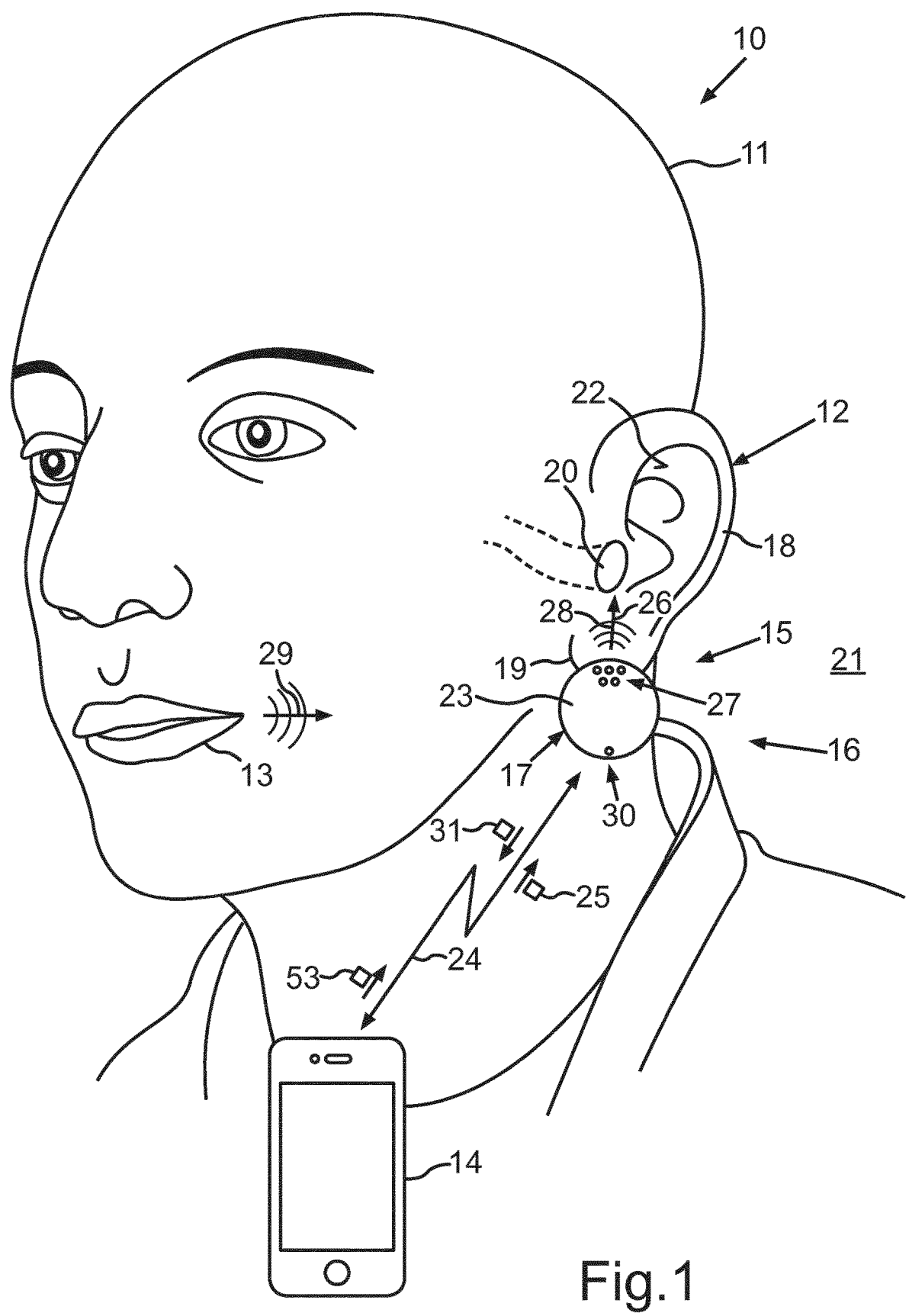

user, in order to use the communication link to transmit a microphone signal from the microphone device to the terminal and to receive a loudspeaker signal for the loudspeaker device from the terminal.

18 Claims, 13 Drawing Sheets

(51) Int. Cl.
  *H04M 1/05* (2006.01)
  *H04M 1/02* (2006.01)
  *A44C 7/00* (2006.01)
  *A44C 15/00* (2006.01)
(52) U.S. Cl.
  CPC .............. *H04R 1/1041* (2013.01); *A44C 7/00* (2013.01); *A44C 7/002* (2013.01); *A44C 7/003* (2013.01); *A44C 15/0015* (2013.01); *A44C 15/0035* (2013.01); *H04M 1/0258* (2013.01); *H04M 1/05* (2013.01); *H04M 1/6058* (2013.01); *H04M 1/6066* (2013.01)
(58) Field of Classification Search
  CPC ... H04M 1/6066; H04M 1/0258; A44C 7/003; A44C 15/0035; A44C 7/00; A44C 7/002; A44C 15/0015; A44C 7/004; A44C 7/009; A44C 13/00
  See application file for complete search history.

(56) References Cited

U.S. PATENT DOCUMENTS

| | | | | |
|---|---|---|---|---|
| 2008/0146890 | A1* | 6/2008 | LeBoeuf | A61B 5/0059 600/300 |
| 2008/0311966 | A1* | 12/2008 | Klein | H04M 1/05 455/575.2 |
| 2009/0215502 | A1* | 8/2009 | Griffin, Jr. | H04M 1/6066 455/569.1 |
| 2010/0112950 | A1* | 5/2010 | Haartsen | H04B 5/0056 455/41.3 |
| 2012/0002822 | A1* | 1/2012 | Peissig | G06F 3/012 381/74 |
| 2012/0308069 | A1 | 12/2012 | Stott | |
| 2013/0343562 | A1* | 12/2013 | Amsalem | H04R 1/105 381/74 |
| 2014/0098983 | A1* | 4/2014 | Clow | H04R 1/10 381/375 |
| 2014/0323183 | A1* | 10/2014 | Klein | H04B 1/385 455/569.1 |
| 2015/0110319 | A1* | 4/2015 | Mimbs | H04R 25/02 381/322 |
| 2015/0349556 | A1* | 12/2015 | Mercando | H02J 7/0044 455/573 |
| 2016/0080581 | A1* | 3/2016 | Sweeney | H04M 19/04 455/458 |
| 2017/0079388 | A1* | 3/2017 | Kita | A44C 7/009 |
| 2017/0185102 | A1* | 6/2017 | Yong | G06F 1/163 |
| 2018/0122202 | A1* | 5/2018 | Brantley | H04W 4/029 |
| 2018/0184204 | A1* | 6/2018 | Stitz | H04R 5/0335 |

FOREIGN PATENT DOCUMENTS

| | | | | |
|---|---|---|---|---|
| CN | 104839951 A | * | 8/2015 | |
| CN | 204741538 U | | 11/2015 | |
| CN | 204741538 U | * | 11/2015 | |
| DE | 10005007 A1 | | 8/2001 | |
| EP | 0512354 A2 | | 11/1992 | |
| EP | 0512354 A2 | * | 11/1992 | ............. H04R 25/60 |
| EP | 2367364 A1 | | 9/2011 | |
| EP | 2369816 A1 | | 9/2011 | |
| JP | 3037262 B2 | * | 4/2000 | |
| JP | 2013162277 A | * | 8/2013 | |
| KR | 20-2008-0005249 | | 11/2008 | |
| KR | 20-2012-005249 | * | 11/2008 | |
| KR | 10-2016-0026177 | | 3/2016 | |
| WO | WO-2006037814 A2 | * | 4/2006 | ............. H04B 1/385 |
| WO | 2008/127316 A1 | | 10/2008 | |
| WO | WO-2015149359 A1 | * | 10/2015 | ............. G01L 15/00 |
| WO | WO-2017049261 A1 | * | 3/2017 | ............. H04R 1/105 |

OTHER PUBLICATIONS

International Search Report issued in PCT Application No. PCT/EP2017/063398, dated Oct. 6, 2017.
Korean Office Action dated Jun. 28, 2019 from Korean Patent Application No. 10-2019-7000232, 11 pages.

* cited by examiner

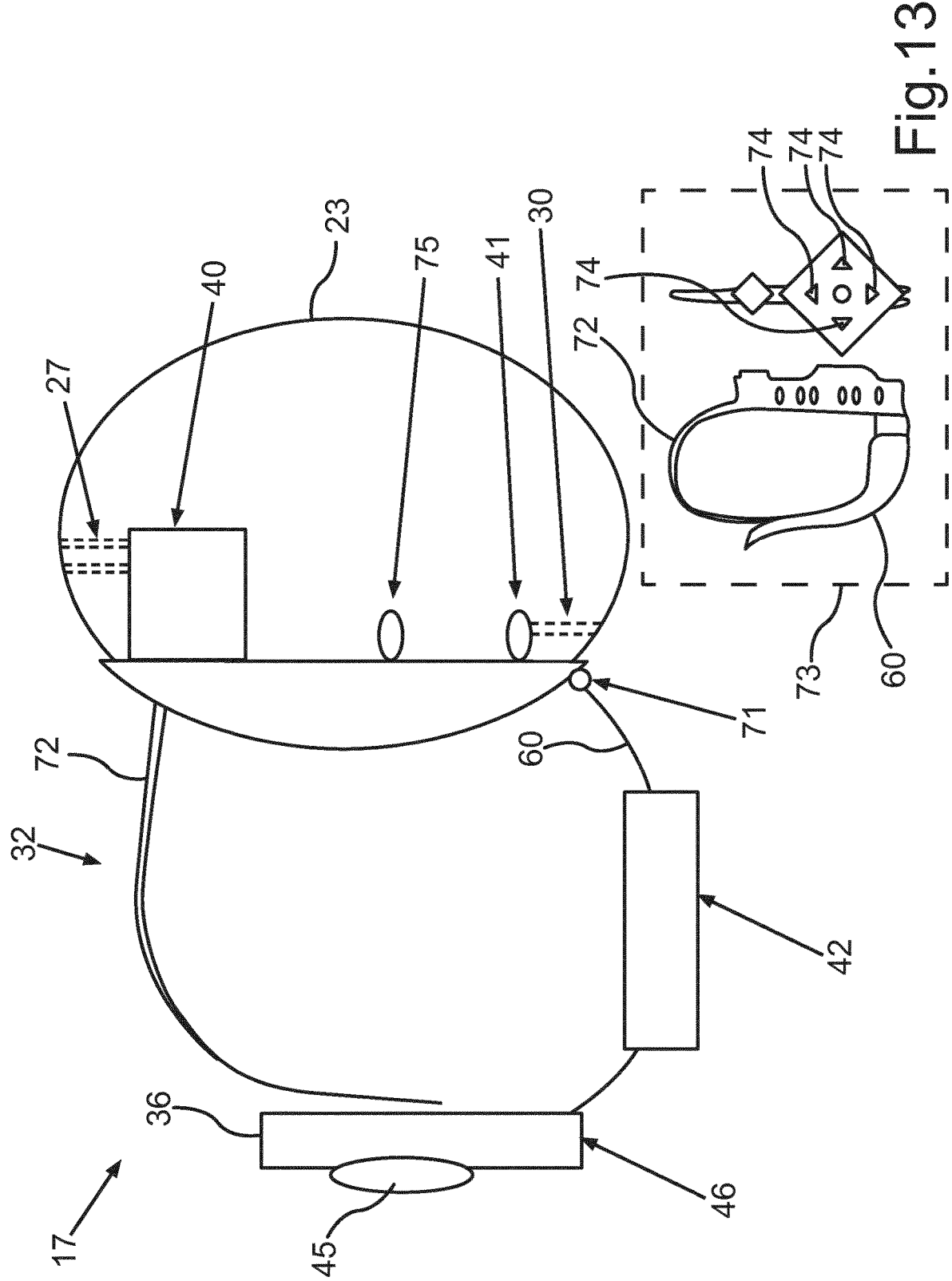

EAR JEWELRY WITH INTEGRATED HEADSET

The invention relates to an ear jewelry which may comprise a single earpiece or two earpieces which may be worn in a predetermined wearing position (as an ear clip, ear stud or earring) on the ear. The ear jewelry further includes electrical components to provide the function of a wireless headset comprising microphone and speaker.

A headset is a supplement to a portable mobile device, such as a smartphone, or a computer to output the voice of the interlocutor during a telephone conversation over the speaker and to capture the voice of the user of the mobile device by means of the microphone. A radio communication-based connection between the headset and the mobile device can be provided so that the user does not have to connect the mobile device via a cable to the headset worn on the head, but instead can wear it freely, for example, in a pocket of a garment.

A headset is usually recognizable by other people and thus represents a visible influence on an external appearance of the user. In particular female users are often bothered by conspicuous housing shapes, which make the technical character of the headset visible. In addition, in most cases the speaker is placed directly in the ear canal, which is uncomfortable for the user.

U.S. Pat. No. 9,049,515 B2 discloses a headset which enables the user to wear the electronics behind a pinna like a hearing aid device. The speaker of the headset is the only component that is arranged on the front of the ear and covered by a decorative plate. The sound of the loudspeaker is directed by means of a hearing tube into the auditory canal of the user. To capture the speech sound of the user for a telephone call, a rod-shaped extension is provided, which protrudes from the area behind the ear to the cheek of the user. As the auditory canal is closed by the sound tube, this headset looks to surrounding people like a hearing aid device and therefore incorrectly causes them to speak very loud or clear, which wearers of the headset may find uncomfortable. In addition, the rod-shaped extension of the microphone may confuse surrounding people due to its not obviously recognizable function.

From US 2008/0311966 A1 a headset is known, which is attached on the auricle like an earring. It consists of several components that are also optically identifiable as different components. The sound is transmitted through a component placed directly in the auditory canal. However, this is on one hand uncomfortable for the user since a part of the device is permanently in the ear canal and on the other hand is this part visually perceived by surrounding people, and thus it remains identifiable as a headset. One embodiment suggests placing the speaker directly in front of the ear canal within the pinna. In this case the sound has to be partially transmitted directly over the bone. Nevertheless, the headset remains identifiable as a technical device and therefore the decorative effect is limited.

EP 2 367 364 A1 discloses a wireless audio headset, which consists of two components, namely a housing and an ear component, that is removed from the housing in the case of use of the headset and is instead attached to the ear. The housing includes at least part of the technical circuit, while at least the speaker is in a position of use in the ear component. The housing is attached to the body or the clothing of the person via a separate fastener. If the headset is not used, the ear component is also attached to the housing. While in use, it is removed from the housing and attached to the ear. The problem for the user is the cumbersome removal of the ear component from the housing and the following re-attaching. Therefore the integrated functionality is not given.

From EP 2 369 816 A1 a system of decorative elements is known that includes a removable communication element that contains a large data memory and which can be locked into position in a mechanical holder.

The object of the invention is to provide a headset that can be worn by people who do not want others to see that they are currently using a headset or that disables bystanders to hear the sound from the headset. At the same time, the headset should not block the ear canal and additionally may be permanently worn on the ear so that it is always available.

The object is achieved by the subject matter of claim 1. Advantageous embodiments of the invention are disclosed by the dependent claims, the following description and the figures.

The invention provides an ear jewelry arrangement or, in short, an ear jewelry which includes at least one earpiece each to be worn on an ear of a user. The ear jewelry can therefore provide a single earpiece or two earpieces. Each earpiece can for example be designed as an ear clip or ear stud or earring. Each earpiece comprises the following two elements, namely a jewelry body and a holding device. The jewelry body is adapted to be carried on a side of the ear that is averted from the user's head, i.e. on the outside of the ear, in a predetermined wearing position of the earpiece. Therefore the jewelry body is visible to an environment as long as it is in the wearing position. The holding device is adapted to carry or hold the jewelry body in the said wearing position on an auricle of the ear, in particular on an earlobe or on a helix of the ear. Therefore the ear canal always remains free in the wearing position. In particular, the incisura intertragica and the cavum conchae inferior of the ear remain free in the wearing position in addition to the auditory canal. In the wearing position each earpiece covers in particular only the earlobe and/or the helix and/or the antihelix and/or the fossa triangularis and/or the superior concha cavity. The wearing position is determined by the configuration of the holding device and the jewelry body. In particular, the ear jewelry only comprises the at least one earpiece. Hence no element or component of the ear jewelry protrudes into the ear canal of the ear.

In the at least one earpiece, the following electrical components are integrated completely and invisibly from the outside. The elements can be arranged in a single earpiece or distributed on two earpieces.

A first component is a microphone device, in other words a sound transducer, which is designed to detect a voice sound which has passed from a mouth of the users head to the earpiece. The microphone device may be configured to detect an airborne sound that has passed from the mouth to the earpiece. Additionally or alternatively, the microphone device may be configured to detect the sound as structure-borne noise or bone sound on a surface of the head and/or the ear. Furthermore, as a second component, a speaker device for radiating a loudspeaker sound, i.e. an airborne sound provided from the respective earpiece in the direction of the ear canal of the respective ear is provided. The loudspeaker device thus radiates the sound from the earpiece, which is arranged at a distance from the auditory canal. The sound then reaches the ear canal through the air of the environment. It has been found that the generation of sound on the earlobe or on the pinna enables the volume of air of the ear canal to vibrate due to the speaker device, even over this distance. Hence a natural-sounding transmission of the sound of the audio signal is enabled. Starting from the earlobe or the pinna, it is possible to enable the air column in the auditory canal of the ear over a distances to vibrate sufficiently and to lead the sound to the eardrum of the user without a connection via a sound tube.

Furthermore, as a third component a communication unit is provided, to which the microphone device and the loudspeaker device can be linked. The communication unit is configured to provide a bidirectional wireless communication link to a users portable mobile device. The communication connection may be based on a Bluetooth standard or a Wi-Fi standard or on an infrared connection. The communication unit is set up to emit a microphone signal of the microphone device to the mobile device via the communication connection and to receive a loudspeaker signal for the loudspeaker device from the mobile device. Thus, the ear jewelry can be used as a headset, for example to transmit a telephone conversation. In this case, a telephone or a smartphone or a tablet PC or a WLAN router (WLAN—Wireless Local Area Network) or a motor vehicle, such as a passenger car, or a personal computer can be provided as the mobile device.

The jewelry body may, for example, be designed as a pearl and/or be decorated with gemstones or pearls and/or have a surface with a decorative structure. In particular a housing of the jewelry body may be made of a precious metal or coated with a precious metal. In total the earpiece can be configured as an earring or ear clip or creole or ear stud. The invention thus attempts for example not to hide the electronics of a headset completely behind the ear of a user, but uses an interior of a jewelry body that can be worn on an outer side of the ear to arrange in its interior one or some or all of the electrical components. Due to the arrangement on the earlobe or on the auricle and the emission of loudspeaker noise in the direction of the auditory canal, an acoustic coupling between the oscillatory air column in the ear canal and the speaker device can be achieved which enables the transmission of an acoustic signal (voice, music) as a loudspeaker sound from the earpiece up to the eardrum without any further devices.

The invention also includes advantageous embodiments with features that provide additional advantages.

As already stated, the said electrical elements in the ear jewelry can be distributed over two earpieces. In one embodiment of the invention, however, the microphone device and the loudspeaker device are integrated in the jewelry body of a common earpiece and the jewelry body includes a housing which has at least one outlet opening for the loudspeaker sound facing the auditory canal in the wearing position and an inlet opening for voice sound on an opposite side. In other words, the at least one outlet opening on the one hand and the inlet opening on the other hand point in opposite directions. This suppresses or at least reduces the feedback of a voice signal of an interlocutor. Additionally or alternatively, an electronic rocker or rocker circuit can be provided, which is alternated between the detection of speech sound on the one hand and the output of loudspeaker sound on the other hand, so that in operation only either the speaker device or the microphone device is currently active.

Several outlet openings may, for example, be formed by a portion of a housing of the jewelry body, which is barred or perforated or drilled, i.e. an arrangement of a plurality of through-holes or holes, which are passable or penetrable for frequencies of the speaker sound.

In a further development a processor unit of the ear jewelry is adapted to dampen a sound signal of the sound component detected by the microphone device so that a feedback suppression of a sound component of the loudspeaker sound is enabled, which has been sent out from the loudspeaker device and propagates in the direction of the microphone device. For this purpose, the processor unit can perform an algorithm of echo cancellation. Additionally or alternatively, the housing has two chambers and the microphone device and the loudspeaker device are arranged in different ones of the chambers for the purpose of feedback suppression. The microphone device and the loudspeaker device are thus separated by a wall of the chambers. This also avoids crosstalk from the speaker device into the microphone device, since the loudspeaker sound generated in the earpiece cannot propagate to the microphone device within the earpiece.

As already stated it is particularly important that, starting from the earpiece, the air space between the speaker device and the auditory canal is effectively overcome so that the loudspeaker sound can cause the air column in the auditory canal to vibrate. For this purpose, the loudspeaker device is preferably linked to the surroundings of the earpiece via a directivity unit. The directivity unit is adapted to direct the loudspeaker sound in the wearing position in a direction towards the auditory canal, so that the loudspeaker sound, after exiting the earpiece, has a main propagation direction in the environment, i.e. a direction of maximum volume, along which the loudspeaker sound enters or at least passes by the auditory canal. In other words, a directed sound is emitted from the loudspeaker device from the earpiece by means of the directivity unit. In case that due to the directivity unit the propagation direction of the airborne sound merely passes by the auditory canal, the result is an acoustic coupling that is sufficiently large enough to cause the air column in the ear canal to vibrate due to diffraction in the region of the auditory canal, i.e. its entrance opening. The directed loudspeaker sound has the additional advantage that another person who is nearby the user cannot hear the loudspeaker sound clearly enough that they could, for example, overhear the content of a conversation.

As a directivity unit, for example, a funnel can be provided that is arranged in the earpiece, which aligns the main propagation direction of the loudspeaker sound in the described manner. Additionally or alternatively, a tube or a pipe arranged in the earpiece can be provided which guides the loudspeaker sound from the loudspeaker device to an outlet opening and thereby aligns the main propagation direction in the described manner. Additionally or alternatively, a plurality of passage openings arranged in an outer wall of the earpiece may be provided in the described manner, i.e. several outlet openings may be provided. The passage openings are arranged relatively to one another in such a way that the respective airborne sound emerging from the passage openings is acoustically superimposed outside the earpiece with the sound from the remaining passage openings and thus results in a so-called beamforming, due to which the main propagation direction of the loudspeaker sound is aligned.

A pipe can also cause a resonance for at least one frequency of the loudspeaker sound and thereby the emission of energy or a power of the loudspeaker sound is promoted at an outlet opening that is arranged downstream of the pipe.

In a further embodiment the ear jewelry is provided with a volume control for adjusting a degree of loudness of the loudspeaker sound and/or an amplification of the microphone signal as a function of at least one operating signal, wherein the at least one operating element comprises at least one of the following. At least one sensor may be provided which generates an operating signal as a function of a tremor of the at least one earpiece. As a result, the volume can be adjusted by tapping the at least one earpiece. A suitable sensor is an acceleration sensor. An analysis device can be provided which detects at least one predetermined pulse in the microphone signal of the microphone device and subsequently generates an operating signal. Thus, a tap on the housing can be registered and used to adjust the volume. The analysis device can be configured in known manner as a software of the said processor unit or as an integrated circuit. It is possible that at least one sensor is provided which generates an operating signal as a function of a swipe movement of an object, for example a finger, on an outer surface of the at least one earpiece. For this purpose, a single capacitive proximity sensor can be provided for generating an approximation signal with a temporal course during the swipe movement of the object, which signals an increase or decrease in the volume. Additionally or alternatively, a series or an array of a plurality of proximity sensors may be provided which sequentially signal an approximation or a removal in a predetermined order during the brushing movement, whereby a distinction can also be made between increasing and reducing the volume. Thus, sensors can be integrated in such a way that a volume control is made possible by "sweeping". A rotational position sensor can be provided which generates an operating signal as a function of an absolute rotational position in space or as a function of a relative rotational position of the portion with respect to a remainder of the ear jewelry upon rotation of a section of the ear jewelry. The rotational position sensor can be configured as a potentiometer or even detect the rotational position of a component of the earrings with respect to the rest, for example the rotational position of the jewelry body absolutely in space or with respect to the holding device.

In a further development of the invention the energy storage device for operating the electrical components in the ear jewelry is integrated so that the energy storage device is disposed in the wearing position behind the pinna between the pinna and the user's head or beneath the pinna, wherein the energy storage device is electrically connected to the electrical components via at least one electrical guide element and the at least one operating element is adapted to modulate the at least one operating signal to an electrical voltage provided in the at least one electrical guide element. Generally a modulation device can be set up to at least modulate at least one sensor signal and/or at least one signal of an operating element to an electrical voltage provided in the at least one electrical conducting element. Thus, no additional wiring for connecting the operating elements with the electrical components arranged in the jewelry body is needed.

As already described, each jewelry body of the ear jewelry is held by a respective holding device on the ear. As a holding device, for example, a fastener or a clip may be provided to hold the jewelry body by clamping on the pinna or the earlobe. Such a clip may be formed, for example, on the basis of a leaf spring or leg spring. The holding device may also provide a so-called ear stud which is passed through or be plugged into a so-called ear hole, i.e. a puncture in the earlobe or the auricle. In particular, the ear stud has a diameter smaller than 4 mm. In the ear hole either no electrical component or only an electrical transmission is provided, but no electronic circuit component. It is preferably provided that the energy storage device for operating the said electrical components, i.e. the communication unit, the speaker device and the microphone device, is integrated in the holding device. This results in the advantage that a relatively heavy component of the ear jewelry, namely the energy storage device, is worn close to the ear. As a result, for example, an uncomfortable feeling on the ear can be prevented. In addition, there is a balance of the components of the ear jewelry with respect to the ear, so that the ear jewelry has no unwanted tilt. As an energy storage device for example a battery may be provided, in particular a button cell.

In case that the holding device has an ear stud, for example a rod or a pipe, which is provided for placement in a perforation (ear hole) of the ear, preferably an additional closure element is provided as part of the holding device which is placed on the opposite side of the ear in the wearing position, that can be attached to the ear stud. The side of the ear which is facing the jewelry body is the backside of the ear, more precisely the area between the ear and the head. This is where the closing element for the ear stud has to be placed, so that the rod or tube, i.e. the ear stud, cannot slip out of the perforation. It is now preferably provided that the said energy storage device is arranged in the closing element. Correspondingly, in the ear stud itself an electrical wire or a metal pin is arranged, which is adapted to electrically connect the energy storage device with the jewelry body. Therefore the ear stud can be a tube with an internal metal wire or metal pin. The metal wire or the metal pin is electrically isolated from the outer wall of the ear stud. It can be provided that by means of a spring, an electrical contact at one end of the ear stud resiliently presses against the energy storage device. As a result, a reliable transmission of electrical energy is ensured even with a movement of the ear.

In case that the energy storage device is arranged on the back of the ear and the jewelry body on the front of the ear, it is preferably provided that a weight of the closing element (with the energy storage device disposed therein) on one hand and a weight of the jewelry body on the other hand differ at the most by a factor of 2, in particular at most by a factor of 1, 5. This results in a distribution of the weight in front of and behind the earlobe or the auricle, so that the ear jewelry does not end up in the said undesirable tilted position.

In a further embodiment at least one sensor is provided in the ear jewelry which is designed to detect in the wearing position at least one predetermined movement of the head in space and then to generate a predetermined control signal for the electrical components. As the sensor an acceleration sensor can be provided. Thus, it is possible to accept a telephone conversation with a nod of the head and to refuse the telephone conversation with a shake of the head.

In order to be able to operate the electrical components in an energy-saving manner, it is preferably provided that a control circuit of the ear jewelry is set up to keep the loudspeaker device and the microphone device de-energized in an idle state, i.e. not to operate it or to keep it switched off. As a result, it is also possible to reduce electromagnetic radiation, which can emanate from an electrical circuit of the loudspeaker device and/or microphone device. Furthermore the control circuit can be set up to supply the loudspeaker device and the microphone device with power in dependence on a wirelessly received wake-up signal of the mobile device. In other words, therefore, incoming telephone calls are immediately accepted by turning on the loudspeaker device and the microphone device by means of the wake-up signal. Thus, the ear jewelry can be turned off without an operating element.

Alternatively, an operating element may be provided which has to be actuated in order, for example, to accept an incoming telephone call, in which case it would be intended to switch on the loudspeaker device and/or the microphone device and/or the communication unit. Such an operating element can, for example, have a mechanical button and/or a proximity sensor for non-contact switching. The provision of an operating element has the advantage that a voice connection to a caller is not established uncontrolledly. Additionally or alternatively, the operating element may be configured to regulate or adjust or set a volume of the loudspeaker device and/or the microphone device in dependence on a user operation. The operating element can have a wheel for this purpose.

In a further development a control circuit is provided inside of the earpiece that is adapted to hold the loudspeaker device and/or the microphone device and/or the communication unit de-energized in an idle state and to supply it with electric current as a function of a predetermined operator action of the user and preferably also only in dependence on the operating action to establish the communication connection. The operating action can be detected with the at least one said operating element. The at least one operating element can thus be provided additionally or alternatively for the volume control and/or the activation.

So if no telephone call is made or received, the communication unit can be switched off. It can be provided for this purpose that the communication unit switches off automatically if no signal is transmitted via the communication connection to the mobile device for a predetermined minimum period of time. Additionally or alternatively, an operating element for switching off the communication unit may be provided, for example a key or another of the operating elements already described.

If a telephone call arrives, it can be received by the mobile device. The mobile device can then output a signal (acoustically and/or by means of vibration). The user can then turn the ear jewelry back on by means of the said operating element, i.e. activate the communication unit, whereupon the communication connection to the mobile device is established by the communication unit and the telephone call can be accepted via the ear jewelry without the need to operate the mobile device itself. The connection is sufficiently fast, so that the mobile device for timely call acceptance does not have to be operated or be taken in hand.

The ear jewelry can thus remain switched off, as long as no call is made. The decisive advantage here is that the radiation exposure is minimized by the ear jewelry for users, since the communication link and the associated electromagnetic radiation are minimized.

If the user himself wants to make a phone call, he can also turn on the communication unit by means of said operating element and for example by triggering a telephone number in the mobile device by means of voice control, without having to take the mobile device into his hands and have to operate it manually.

Another advantage is obtained when each jewelry body has an externally visible, exchangeable decorative element, which is designed to be non-destructive and reversibly detachable from a remainder of the jewelry body, in each case on a side facing the surroundings in the wearing position. This has the advantage that the externally visible appearance of the jewelry body can be changed without having to buy or obtain new electrical components for this purpose. The decorative element can for example be clipped or screwed to the rest of the jewelry body. The decorative element can be a housing of the jewelry body in which the microphone device and the loudspeaker device can be arranged.

In another development the jewelry body features at least one holder or a holding element for selectively clipping and/or attaching at least one replaceable additional decorative element. The holding element can be configured as an eyelet or hook.

A further embodiment provides that a vibration element is provided which is adapted to generate a vibration signal in response to an activation signal of the mobile device upon arrival of a message or call and/or upon pressing the earpiece, in which the vibration element is arranged, to the head to deliver the speaker signal as a structure-borne sound in the head of the user. The pressing can be detected or sensed by means of a sensor. For example, a micro switch may be provided for this purpose. Due to this embodiment, a sound transmission or sound withdrawal is passed over the bone of the skull of the head.

A further embodiment provides that the ear jewelry has at least one sensor for acquiring body data, in particular heart rate and temperature. As a result, information for example regarding a sportive performance of the user are derived.

In a further embodiment the ear jewelry has a panic control that triggers an emergency call in the mobile device when actuated.

A further embodiment provides that the ear jewelry has a holding function which is adapted to hold in response to a predetermined first operating gesture an incoming speech connection and depending on a predetermined second operating gesture to turn the speech connection on again or accept it again.

Figure 2:
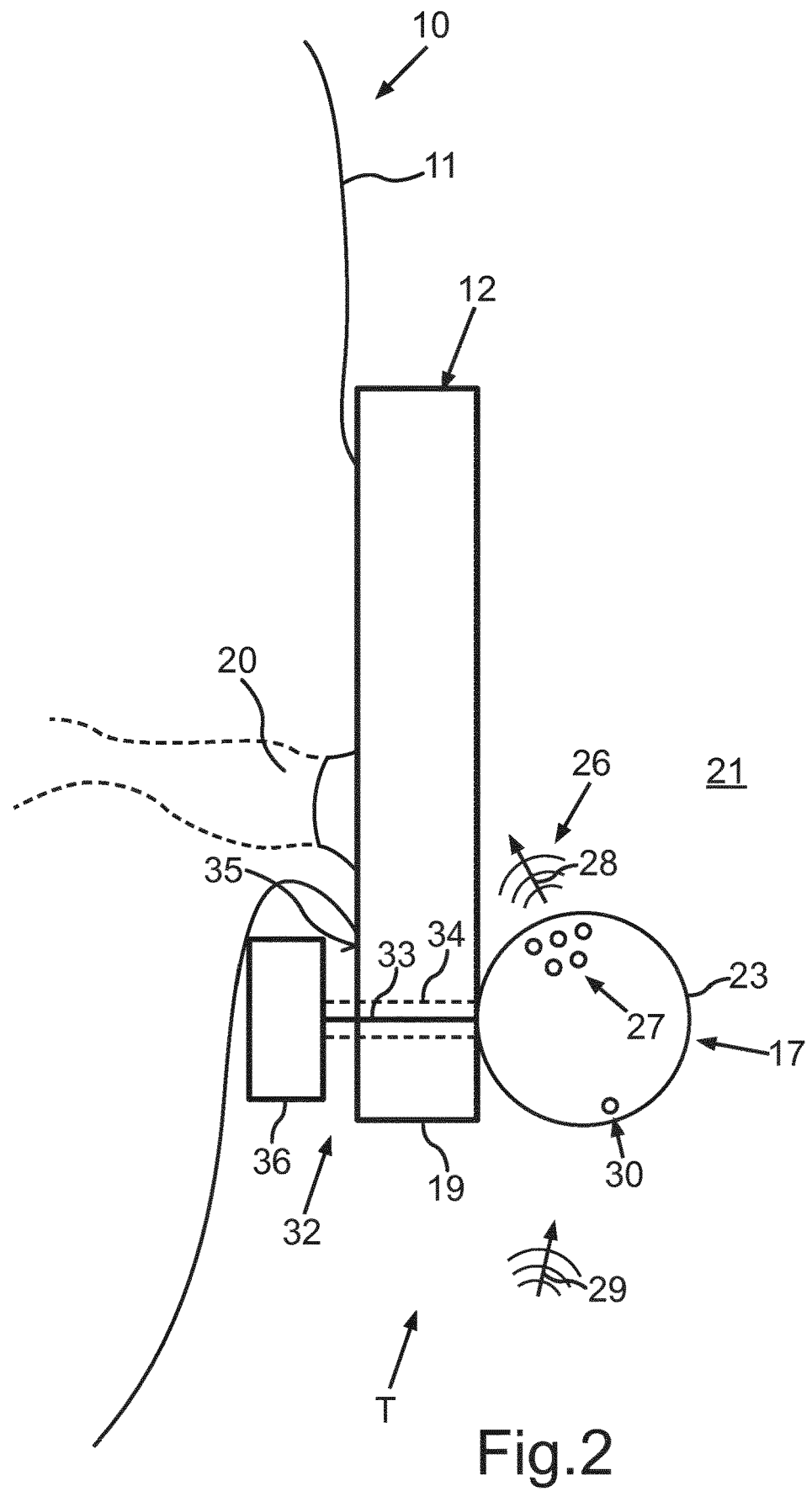
Figure 3:
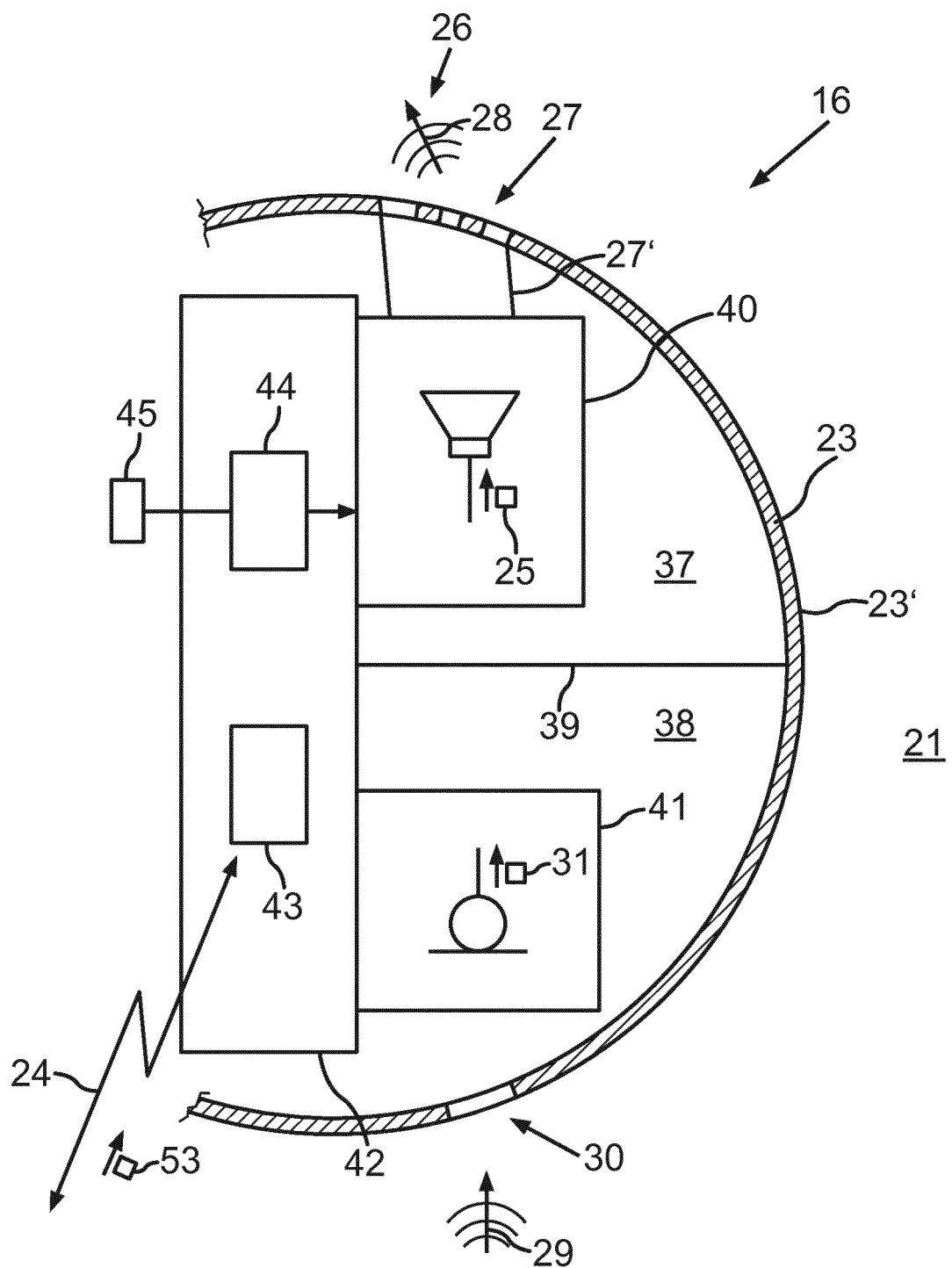
Figure 4:
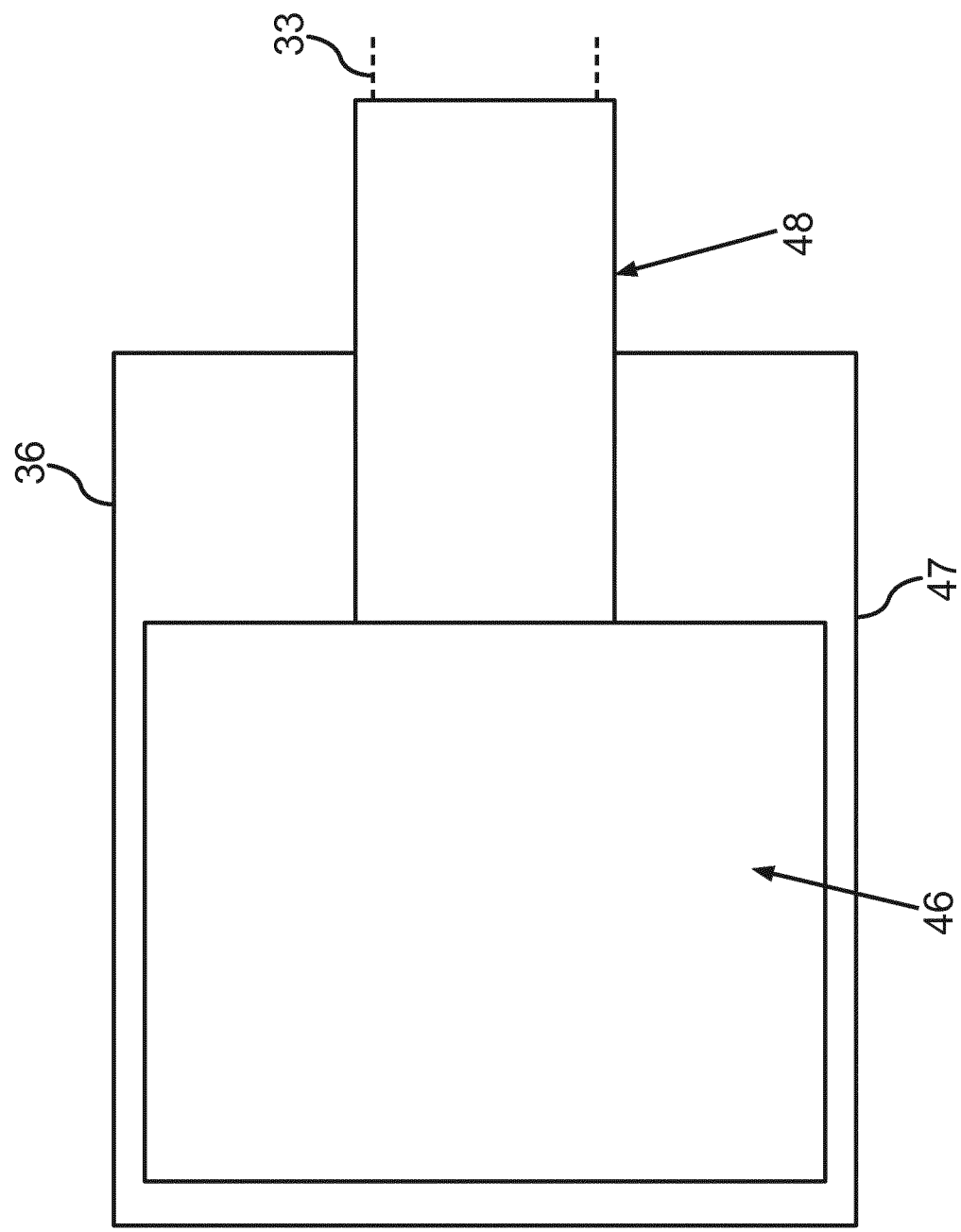
Figure 5:
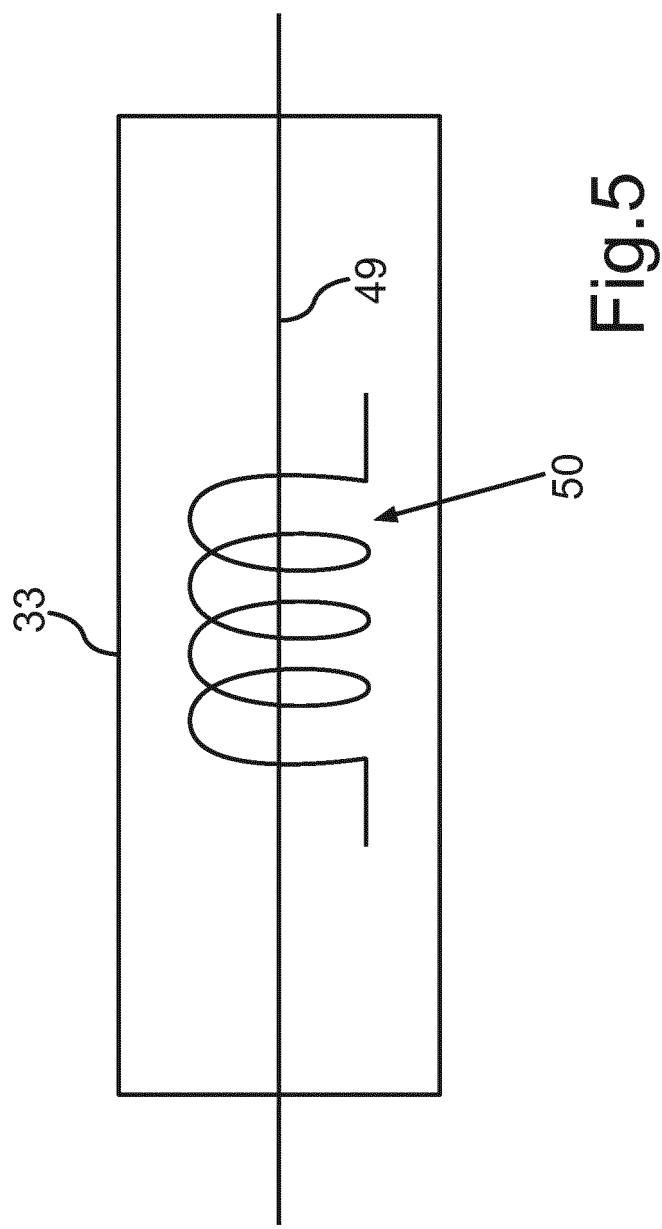
Figure 6:
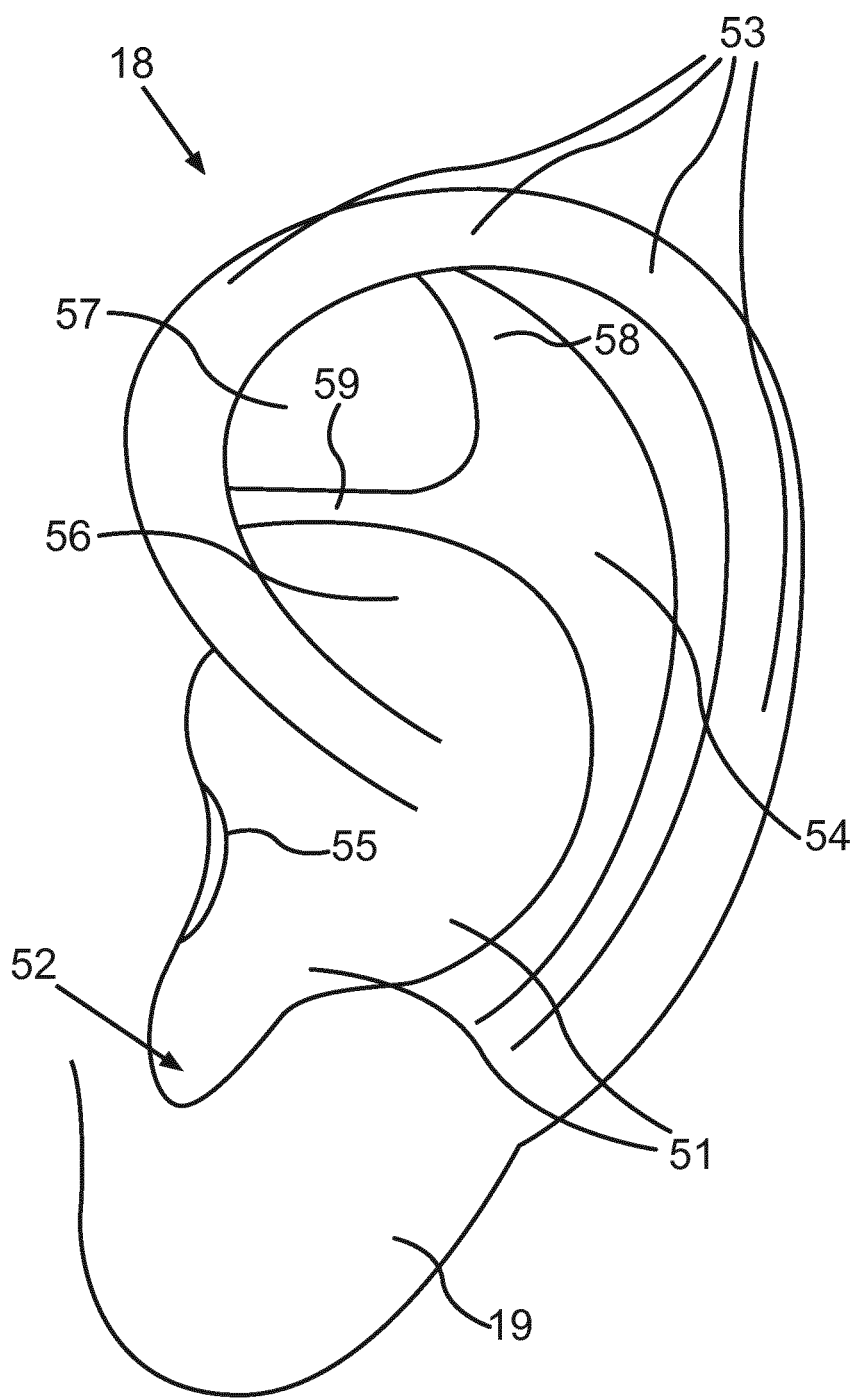
Figure 7:
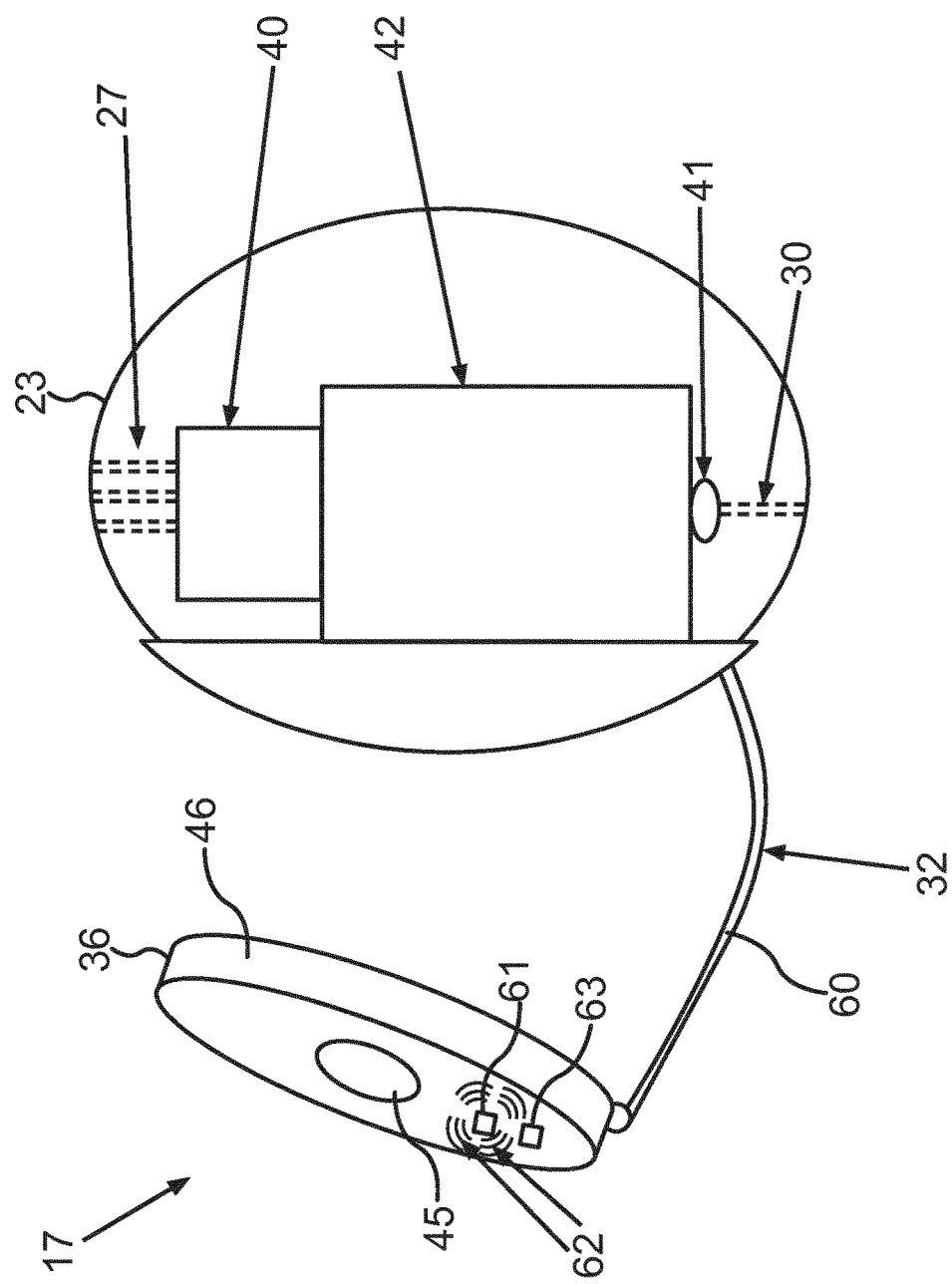
Figure 8:
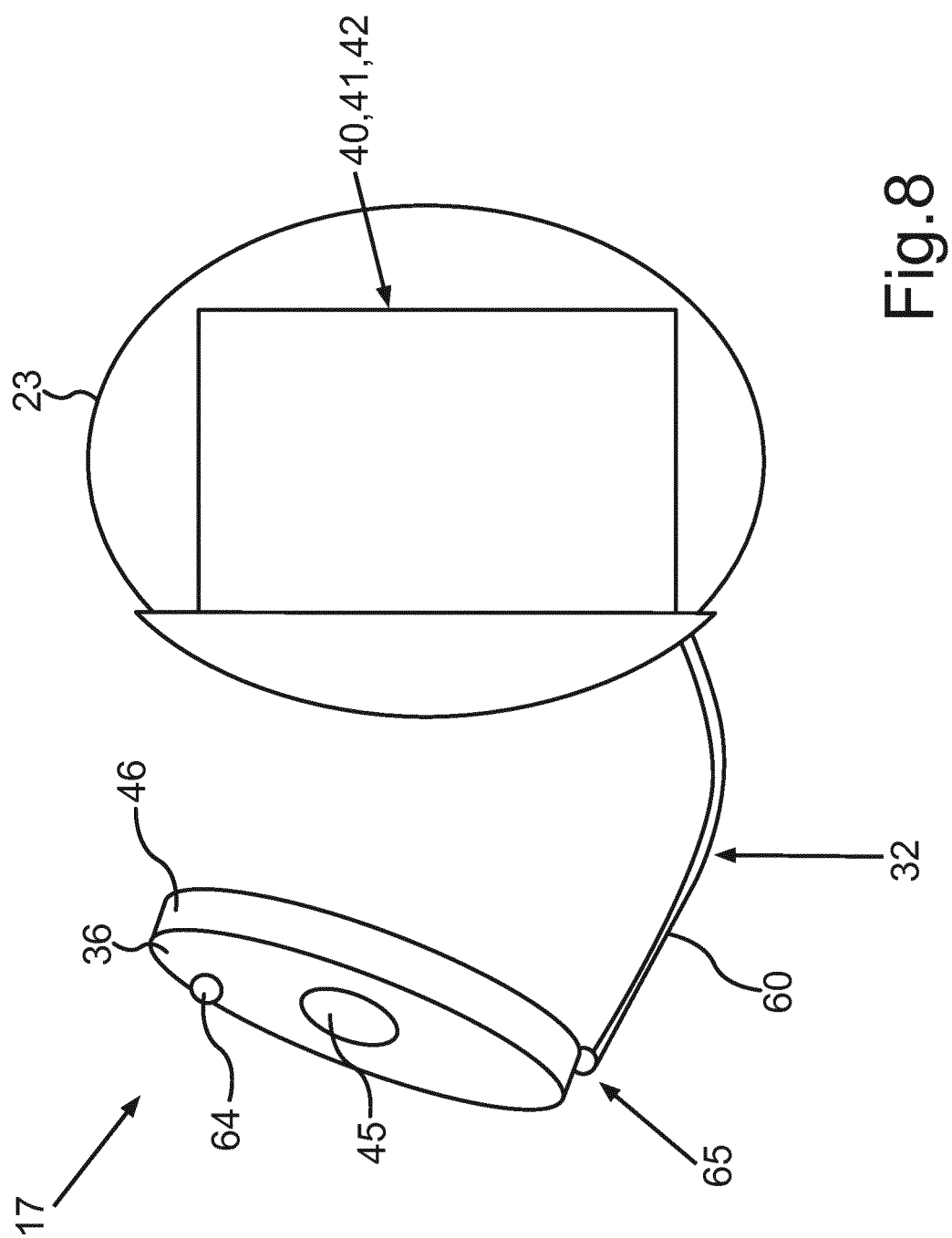
Figure 9:
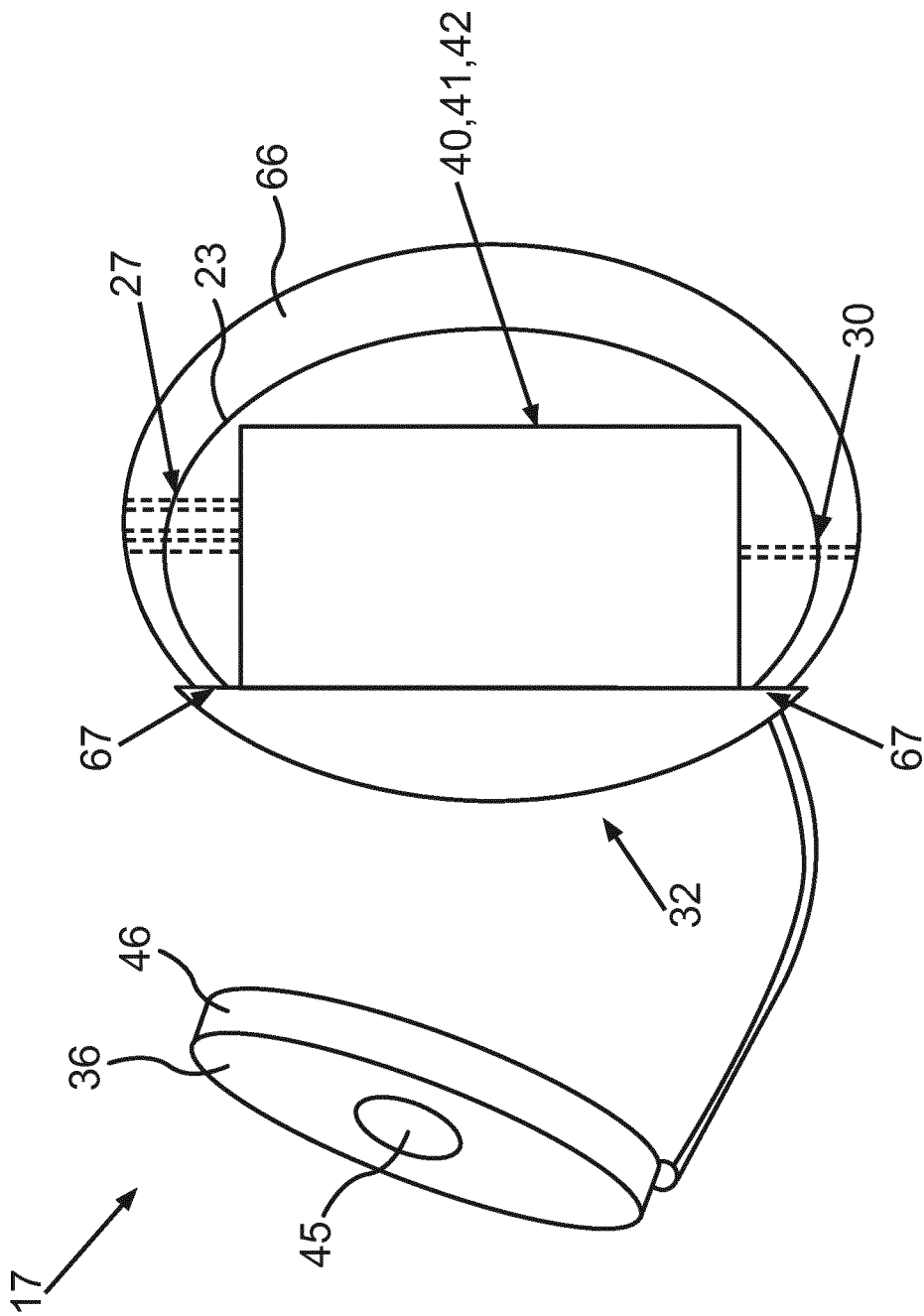
Figure 10:
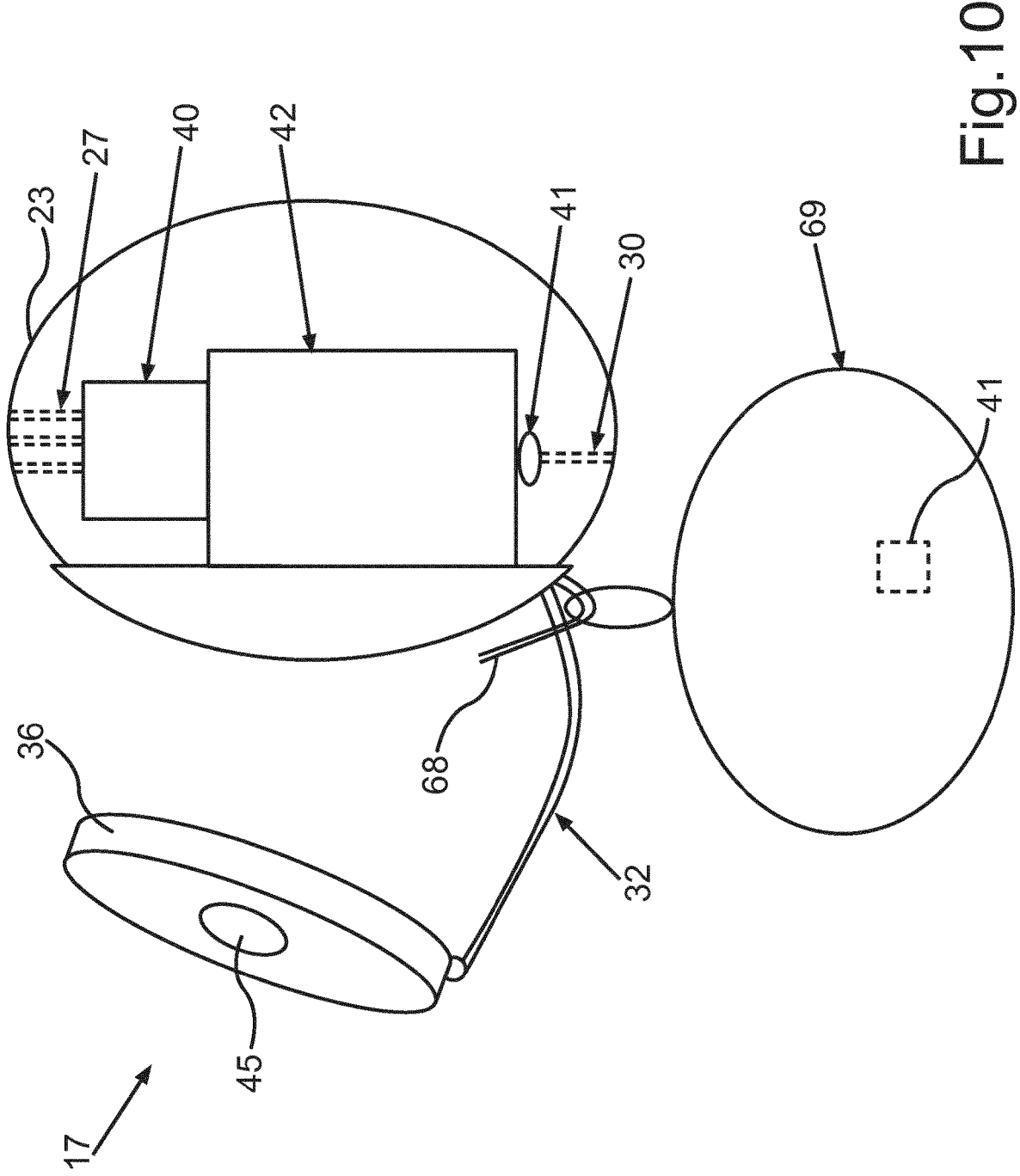
Figure 11:
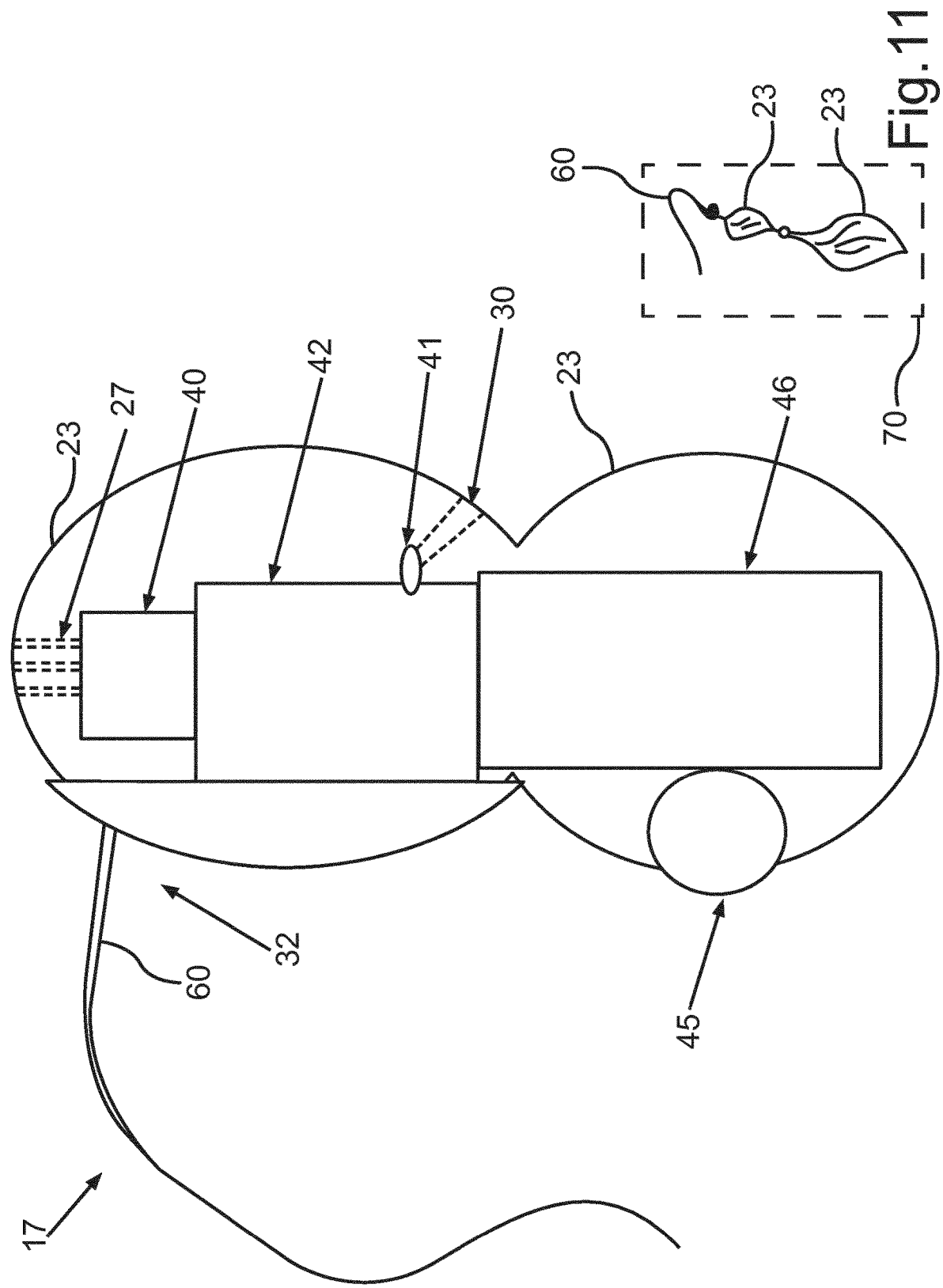
Figure 12:
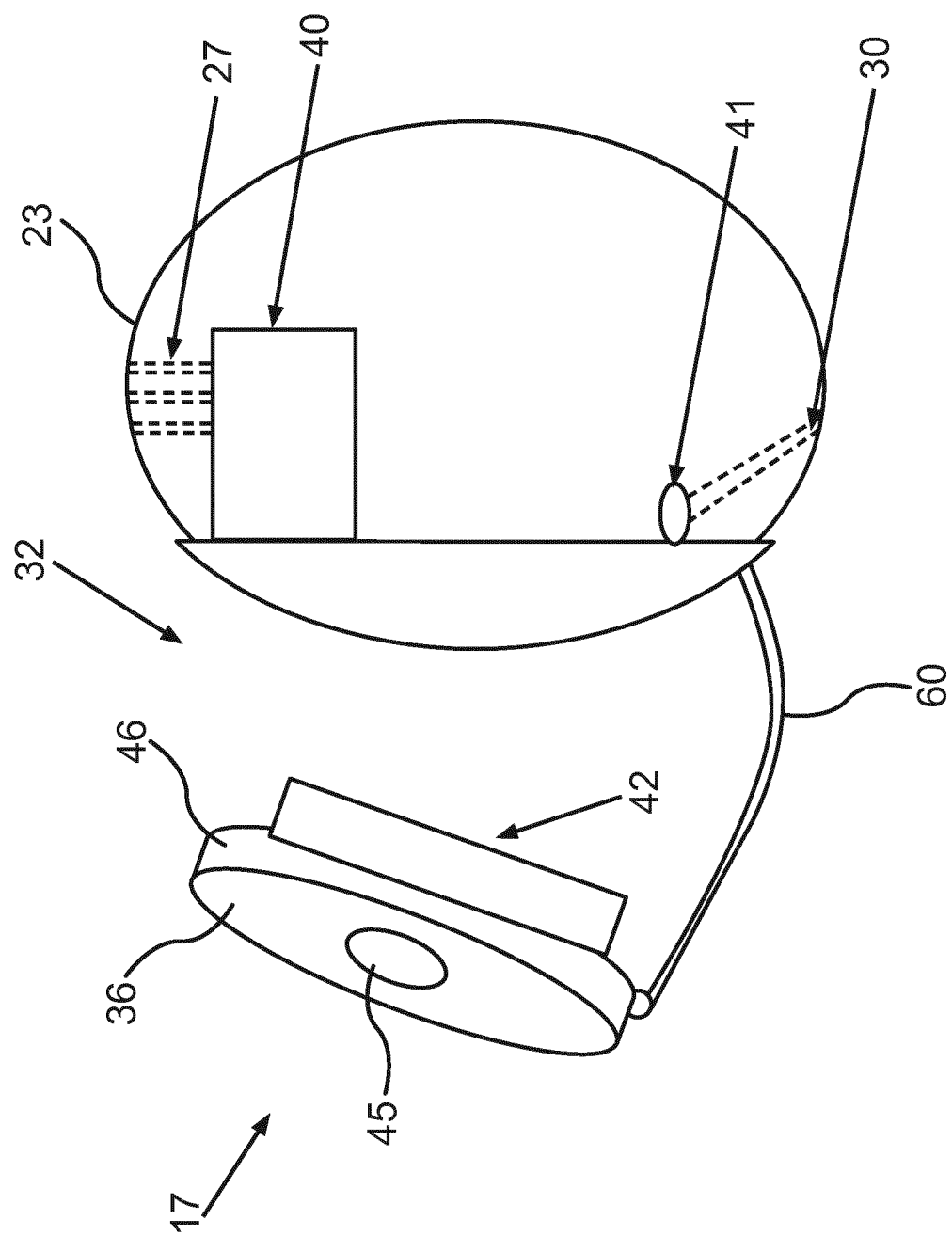

In the following, an implementation example of the invention is described. The figures show:

FIG. 1 a schematic illustration of a perspective view of a user with an embodiment of the ear jewelry according to the invention and with a mobile device;

FIG. 2 a schematic illustration of a frontal view of an ear of the user with the ear jewelry of FIG. 1;

FIG. 3 a schematic illustration of a sectional view of a jewelry body of the ear jewelry of FIG. 1;

FIG. 4 a schematic illustration of a sectional view of a closing element of the holding device of the earpiece of FIG. 1;

FIG. 5 a schematic illustration of a sectional view of an ear stud from a holding device of the ear jewelry of FIG. 1;

FIG. 6 a schematic illustration of an auricle to illustrate the terms of components of the auricle used in this description;

FIG. 7 a schematic illustration of a further embodiment of the ear jewelry according to the invention;

FIG. 8 a schematic illustration of a further embodiment of the ear jewelry according to the invention with a signal modulation of a supply voltage;

FIG. 9 a schematic representation of a further embodiment of the ear jewelry according to the invention with an exchangeable decorative element;

FIG. 10 a schematic illustration of a further embodiment of the ear jewelry according to the invention with a holding element for fastening and/or attaching an additional decorative element;

FIG. 11 a schematic representation of a further embodiment of the ear jewelry according to the invention, in which an energy storage device is integrated into the jewelry body;

FIG. 12 a schematic illustration of a further embodiment of the ear jewelry according to the invention, in which a communication unit is integrated in a holding device of the ear jewelry; and FIG. 13 a schematic illustration of a further embodiment of the ear jewelry according to the invention, in which the communication unit is integrated in the holding device of the ear jewelry.

The exemplary embodiment explained below is a preferred embodiment of the invention. In the exemplary embodiment, the described components of the embodiment each represent individual features of the invention that are to be considered independently of one another, which also develop the invention independently of one another and therefore also individually or in a different combination than the one shown as part of the invention. Furthermore, the described embodiment can also be supplemented by further features of the invention already described.

In the figures, functionally identical elements are each provided with the same reference numerals.

FIG. 1 shows a user 10, his head 11 with an ear 12 and a mouth 13. The user 10 may use a portable mobile device 14, for example to receive or set up a telephone connection with an interlocutor (not shown). The mobile device 14 may be, for example, a smartphone or another one of the devices already mentioned. For telephoning, the user 10 does not have to hold the mobile device 14 to his ear 12. Instead, the user 10 may use a headset 15. This headset 15 is provided by an ear jewelry 16 having an earpiece 17 which may be attached to an auricle 18 or (shown in FIG. 1) to an earlobe 19 of the ear 12. In the attached state, the earpiece 17 is in a wearing position T. An ear canal 20 of the ear 12 is left free or freely accessible in the wearing position T, i.e. not covered by the ear jewelry 16, so that the ear jewelry 16 does not reveal itself to be a headset 15. The wearing position T of the earpiece 17 can be achieved in a known manner by designing the jewelry body 23 and the holding device 32. In addition, a user manual that illustrates the wearing position T may be provided.

From an environment 21, i.e. from an outer side 22 of the ear 12, the earpiece 17 and a jewelry body 23 can be seen as it is typical for every know ear jewelry. In the example illustrated in FIG. 1, the jewelry body 23 is configured as a pearl or ball. It may also be provided another of the above-mentioned shapes for the earpiece 17.

For the telephone call, a wireless communication link 24 between the mobile device 14 and the earpiece 17 can be provided. Via the communication link 24 a speaker signal 25 can be transmitted to the earpiece 17 so that the earpiece 17 generates a loudspeaker sound 26 based on the speaker signal 25, which emerges from several outlet openings 27 of the jewelry body 23 into the environment 21 and with a main propagation direction 28 that is directed to the ear canal 20. A speech sound 29 from the mouth 13 of the user 10 can pass through an inlet opening 30 of the earpiece 17 into the earpiece 17 and is converted there into a microphone signal 31, which can be transmitted via the communication link 24 to the mobile device 14.

FIG. 2 illustrates how the jewelry body 23 can be held by a holding device 32 on, for example, the earlobe 19. The holding device 32 may have an ear stud 33, which may be inserted through an ear hole 34 of the earlobe 19. In particular, the ear stud has a diameter smaller than 4 mm. Thus, a common jewelry ear hole 34 can be used, i.e. no stretched piercing is necessary. On a side 21 facing away from the environment or rear side 35 of the ear 12, the holding device 32 may have a closing element 36, which prevents the ear stud 33 from slipping out of the perforation 34.

FIG. 3 illustrates a possible embodiment of the jewelry body 23. A housing 23' of the jewelry body 23 may have two chambers 37, 38 which may be separated from one another by a chamber wall 39, so that a passage of sound between the chambers 37, 38 is damped. In the chamber 37, a loudspeaker device 40 can be arranged, through which a loudspeaker can be provided, which converts the loudspeaker signal 25 into the loudspeaker sound 26. In the chamber 38 a microphone device 41 may be provided, by means of which the speech sound 29 can be converted into the microphone signal 31 by means of a microphone. The chamber 37 is fluidically coupled via the outlet openings 27 with the environment 21. The chamber 38 is fluidically coupled via the inlet opening 30 with the environment 21.

An arrangement of the outlet openings 27 for the loudspeaker sound 26 may be selected such that the sound emerging from the individual outlet openings 27 results in a directivity or beamforming due to an overlay effect in the surroundings 21, by which the main emission direction 28 is directed to the auditory canal 20. The arrangement may, for example be determined by means of a simulation program. This may additionally or alternatively be effected by a pipe 27' or a hose or a funnel, via which the loudspeaker device 40 may be coupled to the outlet openings 27. The outlet openings 27 that are designed in such a manner and/or the pipe 27' represent a directivity unit.

For operating the speaker device 40 and the microphone device 41, a circuit board 42 may be provided. The circuit board 42 may include a communication unit 43 as a further component, which might be for example a Bluetooth radio module. By means of the communication unit 43, the communication link 24 with the mobile device 14 can be set up.

Furthermore, a control circuit 44 can be provided, by means of which the loudspeaker device 40 and the microphone device 41 can be operated. For example, an operating element 45 may be provided, by means of which a volume of the loudspeaker device 40 and/or the microphone device 41 can be set by setting a signal gain. The operating element 45 may, for example, be provided in the closing element 36 (see FIG. 2). By the control circuit 44, the speaker device 40 and/or the microphone device 41 may also be switched on and off. The operating element 45 may also have an operating possibility for this purpose, for example a button or a proximity sensor.

In the case of the jewelry body 23, the housing 23' decorative element can be made removable or replaceable. Thus, a decorative surface of the jewelry body 23 that is visible for the environment 21 can be replaced while maintaining the electrical components. The housing 23' thus represents a decorative element.

FIG. 4 illustrates the closing element 36 in which an energy storage device 46 may be arranged, for example a battery, in particular a button cell. The energy storage device 46 may be arranged in a housing 47 of the closing element 36. At the ear stud 33, the closing element 36 may be held by a connecting element 48, which may be, for example, a pipe socket that is attached to the ear stud 33.

FIG. 5 illustrates the ear stud 33, which for example may be designed as a tube. The ear stud represents a connector between the jewelry body 23 and the closing element 36.

In the ear stud 33, a metal wire or a metal pin 49 can be arranged, by means of which an electric current can be transmitted from the energy storage device 46 to the loudspeaker device 40 and the microphone direction 41. In other words, in particular the circuit board 42 can be supplied with electrical energy from the energy storage recovery 46 via the metal pin 49. By means of a spring 50, which is arranged in the ear stud 33, it can be achieved that the metal pin 49 is pressed with a predetermined minimum contact force against an electrical contact of the energy storage device 46.

To close a circuit, the connecting element 48 and the tube of the ear stud 33 may be made of an electrically conductive material, in particular metal.

Instead of or in addition to the division into the chambers 37, 38 with the partition wall 39, it can be provided that the device 40 and the microphone device 41 are operated alternately and for this purpose an electronic rocker or rocker circuit is provided, which can switch alternatingly between the two devices 40 and 41.

Due to the circuit board 42, a control via the control circuit 44 can be provided, which switches off the loudspeaker device 40 and the microphone device 41, so that no current flow occurs when no telephone connection is established. It is also preferably provided to switch off the communication connection 24. The switching on of the earpiece 17 can take place via the operating element 45 and/or by a wake-up signal 53 of the mobile device 14, by which the communication unit 43 can be made to set up the communication connection 24 with the mobile device 14.

The ear jewelry 16 results in significant advantages in terms of function, design and ease of use. Due to the complete integration of the functionalities of a wireless communication device in a piece of jewelry or an ear jewelry 16 not only a natural, directed sound transmission from the earlobe or the auricle 18 to the auditory canal 20 is achieved, but also a feedback between the speaker device 40 and the microphone device 41 can be avoided. The weight is distributed in front of and behind the ear 12 by balancing the weight of the jewelry body 23 and the closing element 36. As a result, the comfort when wearing the earpiece 17 is ensured while the communication or a telephone conversation is discrete. The design makes it in particular possible to wear the earpiece permanently. To handle phone calls it is no longer necessary to take the mobile device 14 for example out of a bag.

By keeping the earpiece 17 off while not in use, both battery energy is saved and radiation exposure due to the communications link 24 is reduced. Incoming telephone calls can nevertheless be accepted immediately without the mobile device 14 itself having to be operated or touched. It can thus for example remain comfortably in a bag or purse and the user does not have additional trouble in searching for it.

The communication link 24 also makes it possible to use as the mobile device 14, for example, a tablet PC or a personal computer (PC).

In addition or as an alternative to the transmission of a telephone conversation, the ear jewelry 16 can also be used as an audio device.

FIG. 6 shows the auricle 18 without the ear jewelry 16. The auricle 18 is the outer ear of the user 10. Shown are the following elements:

19 earlobes
51 cavum conchae inferior
52 icisura intertragica
53 helix
54 anti helix
55 tragus
56 cavum conchae superior
57 fossa triangularis
58 upper antihelix root
59 lower antihelix root FIG. 7 shows an earpiece 17 in which an operating element 45, for example a switch, is provided in the holding device 32, for example on the closing element. The embodiment shown in FIG. 7 includes a holding device 32 which is designed as a so-called clip, therefore ear stud are not generally necessary. The operating element 45 can, for example, modulate an electrical voltage during operation, which is transmitted by a cable or in general an electrical conducting element in a connecting element 60, namely from the energy storage device 46 in the closing element 36 to the circuit board 42 in the jewelry body 23.

Furthermore, independently of each embodiment, an actuator or vibration element 61 can be provided, which can generate a vibration signal 62 for a structure-borne sound transmission into the head 11 of the user 10. The vibration element 61 can be activated, for example, as a function of a sensor signal of a sensor 63. The sensor 63 may be, for example, a proximity sensor or a pressure sensor or a photo sensor.

FIG. 8 shows an earpiece 17 in which a charging contact 64 for the energy storage device 46 is provided in the closing element 36. By means of a joint 65, the closing element 36 can be designed to be foldable with respect to the connection element 60, so that the closing element 36 is not only used for clipping the earring, but can also for example be unfolded or folded for insertion into a charger.

FIG. 9 illustrates an earpiece 17 in which the jewelry body 23 has a removable or exchangeable decorative element 66. The outlet openings 27 for the loudspeaker sound and the inlet opening 30 for microphone device can also be provided in the decorative element 66. The decorative element 66 may be configured, for example, as a decorative cap. By means of a fastening mechanism 67, the decorative element 66 can be held, for example, on the holding device 32. The attachment mechanism may be, for example, a screw mechanism or a snap mechanism.

FIG. 10 shows an earpiece 17 in which an additional holding element 68 is provided. The holding element 68 can for example be designed as a hook. An exchangeable additional decorative element 69 can be attached to the holding element 68. For example, a pendant can be attached to the retaining element 68 as an additional decorative element 69. For example the microphone device 41 (shown in the Fig.) can be integrated into the additional decorative element 69. Thereby, a distance between the speaker device 40 and the microphone device 41 can be increased.

FIG. 11 shows an earpiece 17, wherein the energy storage device 46 may be integrated into the jewelry body 23. A perspective view 70 illustrates one possible shape of the jewelry body 23.

FIG. 12 shows an earpiece 17, in which the circuit board 42 with the Bluetooth radio module, an antenna and possible sensors in the closing element 36 is integrated together with an energy storage device 46.

FIG. 13 shows an earpiece 17, in which the circuit board 42 with the Bluetooth radio module is arranged in the connection element 60 of the holding device 32 between the jewelry body 23 and the closing element 36 with the energy storage device 46. By means of a hinge 71, the connection element 60 can be arranged pivotable relatively to the jewelry body 23. A counterpart 72 to the connector 60 may be provided as ear stud for the ear hole 34. FIG. 13 also shows a side view and a front view 73 of a possible shape of the connection element 60. The arrangement of the circuit board 42 in the closing element 36 (see FIG. 12) or in the connection element 60 (see FIG. 13) has the advantage that the ornamental body 23 can for example also have through holes 74.

The embodiments illustrated in FIGS. 12 and 13 assume that the circuit board 42 is not arranged in the jewelry body 23. If at least one sensor for detecting a control gesture or operating action is provided on the circuit board 42, the at least one sensor in these embodiments can be integrated as a sensor 75 in the jewelry body 23. As a result, the at least one sensor remains accessible or approachable from the environment 21.

Overall, the examples show how the function of an inconspicuous so-called headset with speaker and microphone can be provided by the invention, in form of a jewelry worn on the ear.

The invention claimed is:

1. An ear jewelry, comprising:
an earpiece to be worn on an ear of a user, including:
a jewelry body to be stationary when worn in a predetermined wearing position on a side of the ear facing away from a head of the user, such that it is visible to an environment; and
a holder to maintain the jewelry body in the predetermined wearing position on an auricle, wherein while the jewelry body is worn in the predetermined wearing position an auditory canal of the ear remains unobstructed by the jewelry body, wherein
in the earpiece electrical components are completely integrated and invisible from outside the earpiece while the jewelry body is worn in the predetermined wearing position, the electrical components including:
a microphone device to detect a voice sound which passes from a mouth of the head to the earpiece,
a loudspeaker device to emit a loudspeaker sound from the earpiece in a direction of the auditory canal of the ear, and
a communication unit, including an antenna, to provide a bidirectional, wireless communication link to a portable device of the user, wherein the communication unit is adapted to send a microphone signal of the microphone device to the portable device and to receive a loudspeaker signal from the portable device for the loudspeaker device over the wireless communication link, and
wherein
at least the loudspeaker device and the microphone device among the electrical components are provided inside the jewelry body,
a housing of the jewelry body includes a partition wall which extends from an inner surface of the housing to divide an interior of the jewelry body into two chambers, the loudspeaker device being provided in a first chamber on one side of the partition wall and the microphone device being provided on in a second chamber on another side of the partition wall, so that a passage of sound between chambers is dampened,
the loudspeaker device is coupled to the environment via a directivity unit, wherein, while the jewelry body is worn in the predetermined wearing position, the directivity unit is configured to direct the loudspeaker sound in a direction towards the auditory canal, so that after exiting the earpiece into the environment the loudspeaker sound has a main propagation direction along which the loudspeaker sound reaches the auditory canal or at least passes by the auditory canal,
the directivity unit includes a funnel and/or a pipe arranged in the earpiece and/or at least one through-hole which is arranged in an outer wall of the earpiece, and
while the jewelry body is worn in the predetermined wearing position on the auricle and the emission of the loudspeaker sound is directed in the direction towards the auditory canal, an acoustic coupling between an oscillatory air column in the auditory canal and the loudspeaker device is achieved.

2. The ear jewelry according to claim 1, wherein
the electrical components further include a control circuit to control operations of the communication unit, the loudspeaker device, and the microphone device,
the control circuit and the communication unit are provided inside the jewelry body, and
the holder includes:
a closing element, provided on a side of the ear facing toward the head of the user when the jewelry body is worn in the predetermined wearing position, and
at least one of a rod or pipe configured to penetrate a perforation of the ear, and connected at one end to the closing element and at another end to the jewelry body, and
a battery, provided inside a housing of the closing element, is configured to supply electrical energy to the electrical components provided inside the jewelry body via a conductive connector provided inside the at least one of the rod or pipe.

3. The ear jewelry according to claim 1, wherein in addition to the auditory canal the incisura intertragica and the cavum conchae inferior also remain unobstructed while the jewelry body is worn in the predetermined wearing position.

4. The ear jewelry according to claim 1, wherein
at least one outlet opening is disposed at one side of the housing for the loudspeaker sound, the at least one outlet opening facing the auditory canal while the jewelry body is worn in the predetermined wearing position, and
an entrance opening is disposed at an opposite side of the housing for the voice sound.

5. The ear jewelry according to claim 4, further comprising a processor configured to attenuate a sound signal of a sound portion detected by the microphone device, for feedback suppression of the sound portion of the loudspeaker sound which comes from the loudspeaker device and propagates towards the microphone device.

6. The ear jewelry according to claim 1, wherein the earpiece includes at least one operating element configured to provide a volume control to adjust a volume of the loudspeaker sound and/or amplification of the microphone signal based on at least an operating signal, wherein the at least one operating element includes:
at least one sensor to generate the operating signal in response to a sweeping movement of an object on an outer surface of the earpiece, and/or
a rotational position sensor to generate, upon turning of a portion of the ear jewelry, the operating signal in response to an absolute rotational position in space or based on a relative rotational position of the portion of the ear jewelry with respect to a remainder of the ear jewelry.

7. The ear jewelry according to claim 1, wherein
the earpiece includes at least one operating element configured to provide a volume control to adjust a volume of the loudspeaker sound and/or amplification of the microphone signal based on at least an operating signal,
wherein the at least one operating element includes:
at least one sensor to generate the operating signal as a function of a tremor of the earpiece.

8. The ear jewelry according to claim 1, wherein
the earpiece includes at least one operating element configured to provide a volume control to adjust a volume of the loudspeaker sound and/or amplification of the microphone signal based on at least an operating signal, wherein the at least one operating element includes:
a processor configured to detect at least one predetermined pulse in the microphone signal of the microphone device and to generate the operating signal.

9. The ear jewelry according to claim 1, further comprising:
an energy storage configured to provide energy for the electrical components, the energy storage being integrated into the ear jewelry such that, while the jewelry body is worn in the predetermined wearing position, the energy storage is arranged either behind the auricle between the auricle and the head of the user or under the auricle, the energy storage is electrically connected to the electrical components via at least one electrical conducting element and a modulator configured to modulate at least one sensor signal and/or at least one signal of an operating element on an electrical voltage provided in the at least one electrical conducting element, and the operating element includes at least one of a sensor and a processor.

10. The ear jewelry according to claim 1, wherein the ear jewelry further includes at least one sensor configured to detect at least one predetermined movement of the head in space and generate a predetermined control signal for the electrical components.

11. The ear jewelry according to claim 1, wherein the earpiece further includes a control circuit configured to keep the loudspeaker device and the microphone device de-energized in an idle state and to supply power to the loudspeaker device and the microphone device according to a wirelessly received wake-up signal of the portable device.

12. The ear jewelry according to claim 1, wherein the jewelry body includes an externally visible, exchangeable decorative element, configured to be non-destructively and reversibly detachable from a remainder of the jewelry body, and/or includes at least one other holder to selectively attach and/or hang at least one interchangeable additional decorative element which faces the environment while the jewelry body is worn in the predetermined wearing position.

13. The ear jewelry according to claim 1, wherein the ear jewelry further comprises at least one sensor configured to detect body data.

14. The ear jewelry according to claim 13, wherein the body data includes at least one of a heart rate and a temperature.

15. The ear jewelry according to claim 1, wherein the ear jewelry further comprises a panic control element configured to trigger an emergency call when actuated.

16. The ear jewelry according to claim 1, wherein the ear jewelry further comprises a processor which is configured to hold, in response to a predetermined first operating gesture, incoming speech connections and turn on the speech connection again in response to a predetermined second operating gesture.

17. The ear jewelry according to claim 1, further comprising a vibrator configured to generate a vibration signal in response to an activation signal of the portable device upon arrival of a message or call and/or to generate a vibration signal upon pressing the earpiece, in which the vibrator is arranged, to the head of the user to deliver the loudspeaker signal as a structure-borne sound into the head.

18. The ear jewelry according to claim 1, wherein the holder is to accommodate the jewelry body in the predetermined wearing position on an earlobe of the auricle or on a helix of the auricle.

* * * * *